UNITED STATES PATENT OFFICE.

ARTHUR C. SPENCER, OF WASHINGTON, DISTRICT OF COLUMBIA.

PROCESS OF MAKING POTASH AND STRUCTURAL MATERIALS AND PRODUCTS THEREOF.

1,146,532.  Specification of Letters Patent.  Patented July 13, 1915.

No Drawing.  Application filed April 15, 1911.  Serial No. 621,378.

*To all whom it may concern:*

Be it known that I, ARTHUR C. SPENCER, a citizen of the United States, residing at Washington, in the District of Columbia, have invented certain new and useful Improvements in Processes of Making Potash and Structural Materials and Products Thereof, of which the following is a specification.

This invention relates to processes of making potash and structural materials and products thereof; and it comprises a method wherein a potassiferous natural magnesian cement rock is heated and maintained at a temperature above the cement making temperature to cause a sintering and an evolution of potash fumes, the evolved potash is recovered and the residual hot plastic mass is shaped into structural forms or otherwise utilized; and it comprises the product of said process, such product being a sintered natural cement rock, but not having the properties of natural cement; all as more fully hereinafter set forth and as claimed.

There are many "natural cement rocks" which are high in potash and contain magnesia and which, if burnt at a sufficiently low temperature, will form "natural cement". The subjoined compositions may be taken as typical of this class of rock.

|  | A. | B. |
|---|---|---|
| Silica | 23.40 | 16.50 |
| Alumina | 16.72 | 8.76 |
| Ferric oxid | 6.30 | Trace. |
| Lime | 21.91 | 22.20 |
| Magnesia | 4.09 | 11.99 |
| Alkalis | 6.18 | 4.75 |
| Ignition loss | 21.40 | 35.80 |
|  | 100.00 | 100.00 |

In burning cement rock of said character to produce cementitious products which must always be done at a comparatively low temperature, the potash, which may amount to six per cent. or more, of course remains with the material and persists in the cement produced, where it is neither useful nor desirable. The potash remaining in the material produces efflorescence and disintegration of the set cement. Its presence is also undesirable during setting. Burning at ordinary clinker-making temperatures, such as are used in making Portland cement, is not practised with rock of this character for the reason that the products would not pass the usual standard tests for natural cement. Hard clinkered magnesian cement rock does not give "cement" in the usual acceptance of the term. I have however found that by burning these rocks at a high temperature, while I cannot produce good quality cement, I can nevertheless by suitably arranging the conditions fume off and recover the bulk of the potash in a commercially valuable form and can produce a residue of sufficient value for other purposes than cement to meet much of the cost of the operation. By heating the rock of this character to about 1250° to 1600° C. and maintaining it at that temperature for some time, it sinters and begins to clinker without actually fusing down while the potash, the rock being basic, is evolved in the form of fumes which may be collected. With finely powdered material, such as is advantageously used (the evolution of potash being, in a way, proportional to the surface exposed as well as to time and temperature), there will generally be a considerable amount of basic dust, mostly lime, given off and this serves to collect the potash fumes. The dust may be simply caught in a dust chamber and the dust marketed with the contained potash as a fertilizer. Both potash and lime are valuable ingredients of fertilizer. The potash may of course be recovered by leaching the dust; but this is ordinarily more expensive and less advantageous than marketing the dust as such. As stated, the dust is an advantageous type of fertilizer. Where potash, instead of potassiferous dust is sought, the evolution of dust should be suppressed as much as possible; and in such an event the potash fumes may be caught in specially constructed fume chambers, and these chambers may be provided with water sprays. It is often useful to treat the rock in the form of fragments rather than in powdered condition. For instance, it may be cracked to pass a screen of 16 meshes per square inch and separated into from two to four sizes. The several sizes are subjected separately to the heat treatment. By calcination the fragments become porous and under sintering, which frees the potash, the latter readily escapes from the porous clinker. Where water sprays are used, the waste gases from the burning operation are cooled and fan draft in lieu of stack draft may be used.

With collection of the potash in evolved dust no such special apparatus is required and stack draft may be used. Waste gases coming from a dust chamber after having deposited all the potash fume may be, and usually are, still hot enough, say 300° to 400° C., for stack draft. The residue after the evolution of the potash is a hot, plastic, granular or agglomerated material and before loss of its heat it may be compressed by briqueting appliances so as to form open-textured shaped blocks or bricks, useful as a building material, and particularly where heat insulation is required. For structural purposes where little conductivity for heat is required, it is particularly advantageous to make these open-textured shapes, using no more pressure in the shaping operation than is required to produce union of the granules or agglomerates. Such blocks have ample strength for many purposes. Where closer-textured shapes are required, more pressure from appropriate machinery can of course be used.
Another outlet for the residual material is for road-making purposes, either for railroad ballast or vehicle road surfacing. For this purpose it need not be pressed or shaped but may be marketed in the granular or agglomerated form in which it comes from the potash recovery apparatus. While, as stated, the cementitious properties of the material burnt in the way described are not sufficient to make it a hydraulic cement, it is nevertheless sufficiently cementitious to make an excellent road material, being the better for this purpose because of its deficiency in some of the properties required of cement clinker. It is hard and stony and as remaining after exposure to the potash-evolving temperature is more or less agglutinated to form agglomerates of various sizes suitable for road filling. In the road it does not act like prepared cement; but as it breaks up under the wear and tear of traffic, the particles formed hydrate to an extent sufficient to act as a binder or matrix for the residue, or for other road stone with which it may have been used. When applied to a road, in the course of time it forms a hard concrete-like surface, reuniting in a short time wherever broken or disturbed. Or if desired the cinder may be quenched with water as it comes from the furnace, and shipped to the point where it is to be used. Here it is mixed in any desirable proportion with broken stone and the mixture is then spread and well tamped or rolled. Sprinkling is often advantageous during the operation of surfacing. Under traffic the cinder becomes gradually active as a binder and in the course of a few weeks produces an ideal surface which resists the sucking action of pneumatic rubber tires. The use of petroleum with this surfacing material is often advantageous. The oil may be added at the start or it may be sprinkled over the material after its binding qualities have been partly or fully developed by traffic and occasional wetting.

Any suitable type of apparatus may be employed in performing the described process. An ordinary rotary cement kiln, in one or more sections, separately fired if desired in the case of a plurality of sections, or having one fired section communicating with the unfired sections, may be employed. While a rotary kiln is not suitable for making cement from the character of rocks contemplated in the present invention, since the temperatures in the clinkering zone incident to, and necessary for, firing with aerially suspended coal or fine fuel, are too high, yet it is such temperatures as these which are required and desirable in the present invention. The kiln may be provided with ordinary or special types of dust-chambers, where catching the potash in the dust is resorted to, or it may be provided with special fume chambers in case evolution of dust is repressed. The particular manner of collecting the evolved potash fume is not essential in my invention, though, as stated, for a variety of reasons it is considered much more advantageous to collect the fumes with calciferous dust. With proper heating to a sintering temperature, leaching the clinker to recover potash is generally not worth while. If the material is not sintered moistening makes it set and harden.

Various types of furnaces may be employed without departing from my invention. Furnaces heated by carbonaceous fuel are commonly best adapted for the process inasmuch as the products of combustion pass through or over the charge and serve to furnish a carrier for the potash fumes as they are evolved. However, it is feasible and in some places economical to employ an electric furnace to bring about the essential reactions of the process. In using an electrical furnace it is often advisable to pass a current of air or other gas such as $CO_2$ through or over the charge to carry away the potash as it is evolved. Powdered coal is a convenient fuel, though natural oil or gas may be advantageously used where available, or producer gas may be used.

Where collecting the dust is resorted to, an ordinary rotary inclined cement kiln, provided with coal firing at its mouth, may be used, the finely divided material being fed into its upper end and traveling downwardly in the usual manner. It is advantageous to make the final or sintering section separate, giving it but little inclination to retard the passage of material therethrough. This is for the reason that it is desirable to retain the material under the influence of the high heat for some little time, or long enough to give opportunity for a maximum evolution of potash fumes, without interfering with the feed through the calcining zone. The sintered material dropping from the end of the kiln may be received in any suitable conveyer mechanism and conveyed to briqueting apparatus, of which any type may be employed. For this purpose it should not be allowed to cool before compression to a temperature where its plasticity would be interfered with, and for this reason the ordinary forms of clinker coolers, usually found with cement kilns, are undesirable. Where it is not briqueted, it may of course be sent through clinker coolers of the usual type. The hot waste gases carrying potash fumes and emerging from the upper end of the kiln may be sent through ordinary or special dust chambers or potash collectors, as stated.

A typical cement rock useful in the present invention may carry 10 to 24 per cent. silica, 5 to 20 per cent. sesquioxids (ferric oxid and alumina), say 25 per cent. lime, 6 to 12 per cent. magnesia and 4 to 8 per cent. alkalis, of which the main portion is potash. The potash may run from 5 to 8 per cent.; and from 75 to 95 per cent. of this potash may be recovered under the present invention.

In lieu of using finely powdered material in a rotary kiln, coarsely powdered granulated or lump material may be used in either a rotary or a stationary kiln. The kiln must however be run at a temperature markedly higher than those used in making natural cement or burning lime.

In any embodiment of the present process, the temperature must be high enough to cause a complete reaction between the lime of the rock and the silica and silicates such as will evolve or set free the potash in fume form. Complete fusion should be avoided since this would retard the evolution of the fumes and diminish the yield. It is best therefore to use a temperature just below that of complete fusion; one at which the material becomes soft and semi-plastic but does not flow. If discharged in this condition, after evolution of the potash, it is in ideal condition for making briquets or blocks of great mechanical strength.

With many rocks high in magnesia, the calcining operation produces a free disintegration with the production of powder, economizing in the disintegrating operation since in using a rotary the material may be fed into the upper end in coarse form and become fine in its progress. As the material becomes freely porous in the calcining operation, this may be relied upon in using fragmentary material to give the necessary surface for evolution of potash; but in such case more time must be given in the clinkering operation. In a similar manner, other cementitious rocks containing volatilizable constituents may be treated to recover such constituents and at the same time to yield residues suitable for the manufacture of briquets or blocks as above described. For example, phosphorite or other phosphate bearing rock may be burned at temperatures too high to yield a good cement, phosphoric anhydrid being evolved and recovered, and a residue being obtained which is semi-plastic at the clinkering temperature employed, and which may be molded into any desired form while in this condition. Or the sintered mass may be allowed to cool in irregular clinker form and used as road making material as before described. Addition of silicious material to such rock, where the silica content of the rock is relatively low, is often desirable to facilitate evolution of phosphoric anhydrid, since silica displaces phosphoric anhydrid in the reaction.

What I claim is:

1. The process of producing plastic materials which comprises heating a natural cement rock containing potash to a temperature above the sintering point of the same, maintaining the same at such temperature under suitable conditions for causing an evolution of potash until the major part of such potash is evolved, and compressing the hot plastic residue into shaped masses.

2. The process of treating materials which comprises heating a natural cement rock containing potash to a temperature above the sintering point of the same, and maintaining the same at such temperature under suitable conditions for causing an evolution of potash until the major part of such potash is evolved, and the material is converted into a sintered product.

3. In the process of treating rocks for the manufacture of structural blocks, the process which comprises disintegrating a fusible rock, heating the material in the disintegrated form to a point just below the fusing temperature and pressing the sintering material into shaped blocks.

4. In the process of treating rocks for the manufacture of structural blocks, the process which comprises disintegrating a fusible rock, heating the material in the disintegrated form to a point just below the fusing temperature and pressing the sintering material into open-textured shaped blocks.

5. In the process of treating rocks for the manufacture of structural blocks, the process which comprises disintegrating a natural cement rock, heating to a point just below the fusing temperature and pressing the sintering material into shaped blocks.

6. In the process of treating rocks for the manufacture of structural blocks, the process which comprises disintegrating a natural cement rock, heating to a point just below the fusing temperature and pressing the sintering material into open-textured shaped blocks.

7. The process of treating materials which comprises heating a magnesian clay limestone carrying potash to a temperature just below its melting point but above its sintering point under conditions favoring an evolution of fume and dust.

8. As a new article of manufacture, an open-textured block composed of granules of sintered magnesian cement rock cohering at their meeting faces by a fused union.

9. As a new article of manufacture, an open-textured block composed of granules of sintered cement rock cohering at their meeting faces by a fused union.

10. As a new article of manufacture a sintered natural cement rock existing in granules, said material having the approximate composition of a calcined rock of the same nature but not having the properties of "natural cement."

In testimony whereof, I affix my signature in the presence of witnesses.

ARTHUR C. SPENCER.

Witnesses:
K. P. McELROY,
C. W. FOWLER.